United States Patent
Keegan

(10) Patent No.: US 10,532,435 B2
(45) Date of Patent: Jan. 14, 2020

(54) FILLER COMPOSITION FOR HIGH YIELD STRENGTH BASE METALS

(75) Inventor: James Keegan, Troy, OH (US)

(73) Assignee: HOBART BROTHERS LLC, Troy, OH (US)

( * ) Notice: Subject to any disclaimer, the term of this patent is extended or adjusted under 35 U.S.C. 154(b) by 1955 days.

(21) Appl. No.: 10/463,259

(22) Filed: Jun. 17, 2003

(65) Prior Publication Data

US 2004/0256370 A1 Dec. 23, 2004

(51) Int. Cl.
| | |
|---|---|
| B23K 35/30 | (2006.01) |
| B23K 35/36 | (2006.01) |
| B23K 35/40 | (2006.01) |
| B23K 9/173 | (2006.01) |
| B23K 35/02 | (2006.01) |
| B23K 35/362 | (2006.01) |

(52) U.S. Cl.
CPC ............ *B23K 35/406* (2013.01); *B23K 9/173* (2013.01); *B23K 35/0266* (2013.01); *B23K 35/3073* (2013.01); *B23K 35/3602* (2013.01); *B23K 35/362* (2013.01); *B23K 35/3605* (2013.01)

(58) Field of Classification Search
CPC .............. B23K 35/361; B23K 2203/10; B23K 35/406; B23K 9/173; B23K 35/0266; B23K 35/3073; B23K 35/3602; B23K 35/3605; B23K 35/362; C22C 38/06; C22C 9/01; Y10T 117/1028; Y10T 428/1136; Y10T 428/1157; Y10T 428/1143; Y10T 428/1355; Y10T 428/1086; Y10T 428/1091; Y10T 428/1095; Y10T 428/266
USPC .................. 219/145.22, 146.23, 145.1, 146.1
See application file for complete search history.

(56) References Cited

U.S. PATENT DOCUMENTS

| | | | |
|---|---|---|---|
| 2,909,646 A | | 10/1959 | Russell et al. |
| 3,181,970 A | * | 5/1965 | Witherell et al. ........ 219/146.22 |
| 3,635,698 A | | 1/1972 | Heuschkel |
| 3,656,918 A | | 4/1972 | De Long et al. |
| 3,800,405 A | | 4/1974 | Ziemek |
| 3,848,109 A | | 11/1974 | Zvanut |
| 4,331,857 A | | 5/1982 | Crisci et al. |
| 4,423,119 A | | 12/1983 | Brown et al. |
| 4,465,921 A | * | 8/1984 | Sakai et al. .............. 219/146.24 |
| 4,593,174 A | | 6/1986 | Saito et al. |
| 4,782,211 A | | 11/1988 | Kiilunen |

(Continued)

FOREIGN PATENT DOCUMENTS

KR 10-0330793 B1 11/2002

OTHER PUBLICATIONS

Musiyachenko, V.F., et al., "*Effects of cobalt on the structure and properties of high strength weld metal*", Automatic Welding, Jul. 1984, pp. 37-39.

*Primary Examiner* — Eric S Stapleton
(74) *Attorney, Agent, or Firm* — McAndrews, Held & Malloy, Ltd.

(57) ABSTRACT

A weld wire of the present invention comprises a steel sheath encapsulating a fluxed core having a combination of fluxing compounds and alloying elements. The fluxing compounds comprise up to 2% Wt of fluoride compounds and up to 49% Wt of oxide compounds. The alloying elements comprise Mn, Ni, Co, Ti and up to about 0.98% Wt of C. The amount of Co is sufficient to produce a ferrite-bainite weld metal morphology of a resulting weld. A yield strength of the resulting weld was measured from about 95 ksi to about 111 ksi.

14 Claims, 6 Drawing Sheets

(56) References Cited

U.S. PATENT DOCUMENTS

| | | | |
|---|---|---|---|
| 4,810,850 A | | 3/1989 | Tenkula et al. |
| 5,294,462 A | * | 3/1994 | Kaiser et al. ............... 427/446 |
| 5,304,346 A | * | 4/1994 | O'Donnell et al. .......... 420/580 |
| 5,332,628 A | | 7/1994 | Drossman |
| 5,365,036 A | | 11/1994 | Crockett et al. |
| 5,523,540 A | * | 6/1996 | Coldren et al. ............... 219/137 |
| 5,824,992 A | | 10/1998 | Nagarajan et al. |
| 5,857,141 A | | 1/1999 | Keegan et al. |
| 6,242,113 B1 | * | 6/2001 | Kiser ............................ 428/680 |
| 6,674,047 B1 | * | 1/2004 | Hughes et al. .......... 219/145.22 |
| 2002/0043305 A1 | | 4/2002 | Fairchild et al. ............ 148/336 |

* cited by examiner

Table 1. Percentage of components and alloying elements in flux

| Formula | 17-019 | 17-021 | 17-020 | 17-022 | 17-023 | 17-024 | 17-035 | 17-036 | 17-037 | 17-030 |
|---|---|---|---|---|---|---|---|---|---|---|
| Fill % | 16.5 | 16.5 | 16.5 | 16.5 | 16.5 | 16.5 | 16.5 | 16.5 | 16.5 | 16.5 |
| Flourides | 1.96% | 1.96% | 1.96% | 1.96% | 1.96% | 1.96% | 1.96% | 1.96% | 1.98% | 1.96% |
| Oxides | 47.83% | 47.83% | 47.83% | 47.83% | 47.83% | 47.82% | 47.84% | 47.84% | 39.51% | 47.48% |
| C | 0.98% | 0.98% | 0.98% | 0.98% | 0.98% | 0.98% | 0.98% | 0.98% | 1.00% | 0.98% |
| Si | 2.44% | 2.44% | 2.44% | 2.44% | 2.44% | 2.44% | 2.44% | 2.44% | 2.90% | 2.44% |
| Mg | 1.98% | 1.98% | 1.98% | 1.98% | 1.98% | 1.98% | 1.98% | 1.98% | 1.98% | 1.98% |
| Ti | 0.77% | 0.77% | 0.77% | 0.40% | 0.00% | 0.00% | 0.00% | 0.59% | 0.59% | 0.40% |
| Mn | 11.78% | 16.60% | 14.60% | 16.60% | 16.60% | 16.60% | 16.60% | 16.60% | 19.40% | 16.60% |
| B | 0.06% | 0.00% | 0.00% | 0.00% | 0.00% | 0.00% | 0.06% | 0.06% | 0.06% | 0.00% |
| Co | 4.98% | 4.98% | 4.98% | 4.98% | 4.98% | 4.98% | 4.98% | 4.98% | 5.80% | 4.98% |
| Ni | 11.18% | 11.18% | 11.18% | 11.18% | 11.18% | 11.18% | 11.18% | 11.18% | 13.20% | 11.18% |
| Mo | 0.00% | 0.00% | 0.00% | 0.00% | 0.00% | 0.00% | 0.00% | 0.00% | 0.00% | 0.00% |
| Fe | 16.04% | 11.28% | 13.28% | 11.65% | 12.05% | 11.82% | 11.74% | 11.14% | 13.34% | 11.76% |
| Cr | 0.00% | 0.00% | 0.00% | 0.00% | 0.00% | 0.00% | 0.00% | 0.00% | 0.00% | 0.00% |
| Zr | 0.00% | 0.00% | 0.00% | 0.00% | 0.00% | 0.23% | 0.23% | 0.23% | 0.23% | 0.23% |
| Total | 100.00% | 100.00% | 100.00% | 100.00% | 100.00% | 100.00% | 100.00% | 100.00% | 100.00% | 100.00% |

FIG.3a

Table 2. Weld metal compositions

| Formula | Predicted Yield | HI: 0 for Slow cool | Actual Yield | % Error in Yield | C | MN | SI | CU | CR | NI | MO | TI | CO | B |
|---|---|---|---|---|---|---|---|---|---|---|---|---|---|---|
| 17-013 | 101,246 | 0 | | | 0.115 | 1.35 | 0.13 | 0.01 | 0.10 | 2.12 | 0.02 | 0.041 | 0.70 | 0.0046 |
| 17-012 | 100,996 | 0 | | | 0.115 | 1.35 | 0.21 | 0.01 | 0.10 | 2.12 | 0.02 | 0.041 | 0.70 | 0.0046 |
| 17-011 | 92,481 | 0 | | | 0.104 | 1.23 | 0.28 | 0.01 | 0.10 | 1.95 | 0.02 | 0.058 | 1.58 | 0.0042 |
| 17-004 | 86,919 | 0 | 88,500 | 2 | 0.124 | 1.12 | 0.26 | 0.01 | 0.13 | 1.14 | 0.02 | 0.041 | 1.01 | 0.0044 |
| 17-001 | 95,413 | 0 | 93,600 | 2 | 0.131 | 1.23 | 0.28 | 0.01 | 0.16 | 1.19 | 0.03 | 0.038 | 0.67 | 0.0065 |
| 17-006 | 93,111 | 1 | 95,600 | -3 | 0.122 | 1.25 | 0.27 | 0.01 | 0.05 | 1.13 | 0.02 | 0.041 | 1.66 | 0.0045 |
| 17-008 | 93,701 | 0 | 88,500 | 6 | 0.153 | 1.35 | 0.21 | 0.01 | 0.10 | 1.06 | 0.02 | 0.038 | 1.74 | 0.0046 |
| 17-005 | 98,511 | 1 | 100,000 | 2 | 0.115 | 1.46 | 0.33 | 0.01 | 0.06 | 1.08 | 0.02 | 0.048 | 1.88 | 0.0055 |
| 17-010 | 87,396 | 0 | 89,000 | -2 | 0.164 | 1.04 | 0.25 | 0.01 | 0.15 | 1.19 | 0.04 | 0.036 | 1.36 | 0.0026 |
| 17-014 | 102,706 | 0 | | | 0.140 | 1.46 | 0.31 | 0.01 | 0.06 | 2.14 | 0.02 | 0.046 | 1.87 | 0.0050 |
| 17-015 | 106,427 | 0 | | | 0.140 | 1.46 | 0.31 | 0.01 | 0.06 | 2.14 | 0.02 | 0.046 | 1.00 | 0.0050 |
| 17-016 | 92,906 | 0 | 91,200 | 2 | 0.140 | 1.13 | 0.23 | 0.02 | 0.17 | 2.15 | 0.03 | 0.033 | 0.78 | 0.0001 |
| 17-020 | 102,805 | 0 | 101,600 | 1 | 0.139 | 1.51 | 0.29 | 0.02 | 0.16 | 1.95 | 0.03 | 0.041 | 0.89 | 0.0000 |
| 17-021 | 110,750 | 0 | 108,000 | 2 | 0.153 | 1.70 | 0.28 | 0.02 | 0.15 | 2.12 | 0.03 | 0.035 | 1.02 | 0.0000 |

FIG.3b

Table 3. Actual weights (in lbs) of the fluxing components in the fluxed core.

| Current formula | MegaK-17-019 | MegaK-17-021 | MegaK-17-020 | MegaK-17-022 | MegaK-17-023 | MegaK-17-024 |
|---|---|---|---|---|---|---|
| Fill | 16.500 | 16.500 | 16.500 | 16.500 | 16.500 | 16.500 |
| Fluorides | 0.098 | 0.098 | 0.098 | 0.098 | 0.098 | 0.098 |
| Oxides | 2.39 | 2.39 | 2.39 | 2.39 | 2.39 | 2.39 |
| Mg | 0.0990 | 0.0990 | 0.0990 | 0.0990 | 0.0990 | 0.0990 |
| Ti | 0.0386 | 0.0386 | 0.0386 | 0.0198 | 0.0000 | 0.0000 |
| Mn | 0.5890 | 0.8300 | 0.7300 | 0.8300 | 0.8300 | 0.8300 |
| B | 0.0030 | 0.0000 | 0.0000 | 0.0000 | 0.0000 | 0.0000 |
| Co | 0.2490 | 0.2490 | 0.2490 | 0.2490 | 0.2490 | 0.2490 |
| Ni | 0.5590 | 0.5590 | 0.5590 | 0.5590 | 0.5590 | 0.5590 |
| Mo | 0.0000 | 0.0000 | 0.0000 | 0.0000 | 0.0000 | 0.0000 |
| Fe | 0.8019 | 0.5639 | 0.6639 | 0.5827 | 0.6025 | 0.5909 |
| Cr | 0.0000 | 0.0000 | 0.0000 | 0.0000 | 0.0000 | 0.0000 |
| Zr | 0.0000 | 0.0000 | 0.0000 | 0.0000 | 0.0000 | 0.0115 |
| Metallics | 2.5075 | 2.5075 | 2.5075 | 2.5075 | 2.5075 | 2.5078 |
| Total | 4.9969 | 4.9969 | 4.9969 | 4.9969 | 4.9969 | 4.9972 |

FIG.3c

PHYSICAL TESTS

SPEC NO: P22549  TYPE: MEGAZORD                     CO./LOG:
TEST/SER NO: MEGAK-17-005                SHEET/DEV: Q00000    SIZE: .045
FM SPEC: AWS A5.29        CLASS: E110T1-G           ENGINEER: JIM
DATE WELDED: 03/20/2003   WELDED BY: JL             WELDER NO:
AMPS: 250    VOLTS: 28.0  WFS: 480   CURRENT: DCEP    GAS: 75/25
ESO: 0.750        TRAVEL SPEED: 14.0       JOULES/IN:         0
POSITION TESTED: FLAT                               PLATE
ROOT OPENING: 0.500          PASS SEQUENCE     GRADE:HY100
INCLUDED ANGLE: 45           2,2,2,2,2,3,3,3,3      LENGTH:    12
PREHEAT TEMP: 200    LAYERS 1 2 3 4 5 6 7 8 9 10    THICKNESS: 1.000
INTERPASS TEMP:225           TOTAL PASSES: 22       BACKUP
WELDER COMMENTS:                                    WIDTH:     1.000
                                                    THICKNESS:0.500

RADIOGRAPH  SPEC:YES AWS A5.29
RADIOGRAPH  RESULTS:CONFORMS  JBII
REMARKS:

TENSILE TEST                          IMPACTS
TYPE/ID   AGE 48HRS    .505 DIA      PWHT/AW
PWHT/AW   @220F                      AW
YIELD     100000           0         IMP NO     TEMP F     FT.LBS.
TENSILE   106600           0            1       -40C         38
ELONG.%     21.0         0.0            2       -40C         47
R OF A %    53.1         0.0            3       -40C         49
                                        4       -40C         49
          DYNAMIC TEARS                 5       -40C         45
  NO.     TEMP F      FT.LBS.           6       -60C         24
   1                     0              7       -60C         35
   2                     0              8       -60C         30
   3                     0              9       -60C         21
   4                     0             10       -60C         18
                                       11                     0
BEND TEST                              12                     0
 FACE:       ROOT:      SIDE:          13                     0
                                       14                     0
REPORTED BY: LLW   DATE: 03/27/2003    15                     0
CHEMISTRY OF TENSILE:
  C   0.115    MN   1.457    P  0.015    S  0.011   SI  0.328   CU  0.000

CR   0.063   V   0.017    NI  1.084   MO  0.018   AL  0.004   TI  0.048

ZR  0.0010   NB  0.011    CO  1.8840   B  0.00550  SN  0.0010  TA  0.0000

PB  0.00030  CE  0.0000   LA  0.0000  COMB CARB   0.109

ADDITIONAL INFORMATION

FIG. 5

FILLER COMPOSITION FOR HIGH YIELD STRENGTH BASE METALS

FIELD OF THE INVENTION

The present invention relates to a method of producing welds with high yield strength requirements. More particularly, the present invention relates to a consumable flux cored welding electrode alloyed with Co for controlling weld metal morphology in a flux cored arc welding process.

BACKGROUND OF THE INVENTION

Flux-cored arc welding (FCAW) is a welding process where the heat is generated by an arc between a tubular wire electrode continuously fed into a welding machine and work piece. The wire electrodes used for the FCAW process comprise a metal sheath surrounding a core of fluxing and/or alloying elements and compounds. Typically the arc and the molten metal are shielded from the surrounding environment by a shielding gas. The chemical composition of the sheath, the fluxed core and the shielding gas determine the composition and properties of the resulting weld. The consumable electrode melts in the arc and is carried across the arc in a stream to become the deposited filler metal. Shielding of the arc is provided either by the flux contained in the tubular wire electrode or by an externally provided shielding gas.

The FCAW process is accomplished by a welding machine which is operated by a power source. The welding machine feeds a consumable electrode and provides the shielding gas into the welding process. The welding machine is powered by a power source which provides the electric power of the voltage and amperage necessary to maintain the arc. Most welding machines for the FCAW process operate on 110, 230 or 460 volt input power. The power sources used for the FCAW process are usually direct current constant voltage sources, but often use higher currents than gas-metal arc welding process, requiring a larger power source.

FCAW is a direct current welding process. The consumable electrode wires for FCAW designed to work with external gas shielding are normally used in the direct current electron positive welding configuration (DCEP). DCEN is typically used for self-shielded arc welding.

Since in the FCAW process a consumable wire electrode must be fed into the welding machine, a wire feeding system is required to provide continuous feeding. Several wire feeding systems are available and can be used in the FCAW process. Most of the systems provide a constant feeding speed and are used with a constant voltage power source. If a variable speed wire feeding system is used, a voltage sensing circuit is provided to maintain the desired length of the arc by varying the feeding speed of the wire. A wire feeding system usually comprises an electrical rotor connected to a gear box with a number of driving rolls.

In externally shielded FCAW welding machines, a shielding gas system supplies a shielding gas from a gas source (liquid in storage tanks or compressed in gas cylinders) to the working space to shield the arc from the surrounding environment. Typically, a shielding gas system comprises a source, a gas supply hose, a gas regulator, control valves and a hose supplying the gas to the welding machine. Shielding gases, which can be inert and/or active gases, surround the arc and a puddle of molten metal. The most commonly used shielding gases in the FCAW process are Ar, $CO_2$, Ar—$O_2$ mixture, Ar—$CO_2$ mixture. The choice of a particular shielding gas or mixture depends on the type of metal to be welded, arc and metal transfer parameters, properties of the weld and bead shape.

Only very few filler metals are known to be suitable for welding structural steels which have a yield strength of 100 ksi and higher, requiring good impact toughness at low temperatures. The problem with the filler metals is known to be poor weld metal toughness, hydrogen cracking and hot cracking of the final weld metal. The cold and hot cracking problems draw particular attention in structural welding, such as support structures for pipelines or oil rigs, where it is undesirable to have any cracks in the weld metal joining two metal pieces. Stick electrodes used in the stick-metal arc welding process (SMAW) which can provide the desired mechanical properties in structural steels, but the SMAW process is much slower, and therefore less productive, than the FCAW process (the fluxed core heats up and melts faster, transferring and depositing the filler metal on the work piece faster). For this reason FCAW is frequently used for welding ferrous metals, such as steels, when high deposition rates are desired.

Problems such as cold and hot cracking have been particularly undesirable in weld joints in structural steels. One of the reasons causing cold cracking is a relatively high amount of hydrogen or water in a consumable wire electrode, causing the resulting weld metal to contain quantities of hydrogen sufficient to cause cold cracking. Molecules of water present in the fluxed core dissociate in the welding arc into hydrogen and oxygen. Some amount of dissociated hydrogen and oxygen will diffuse into the molten weld pool during the welding process. As the metal cools, hydrogen trapped inside diffuses and concentrates on the defects inside the metal. If the concentration of hydrogen on the structural defects and the residual stresses caused by the welding process are sufficiently high, cracks will form in the weld metal.

During welding the consumable wire electrode enters the arc, melts and gets transferred to the work piece to form a molten weld pool and a molten slag pool. The slag pool solidifies first, and the molten metal solidifies later, taking on the shape of the solidified slag. As the metal solidifies, dendrite crystals form and grow in the direction of solidification, which is the same as the direction of welding. The formation and growth of the dendrite crystals results in creating of the area of different alloying concentrations, known as "partitioning". For alloying elements with a small atomic radius, such as, for example, Boron, their high diffusion rate allows them to diffuse in high enough concentrations to the inter-dendritic areas of the weld, causing differences in the melting points of the inter-dendritic areas and the parent weld metal. The areas with lower melting temperatures will not able to withstand the stresses caused by solidification, and the hot cracks will form. The higher concentrations of Boron make hot cracking more likely to occur. If a crack propagates through a weld, a structure joined by such a weld may not conform to the desired strength specifications.

To obtain the desired mechanical properties of the welded joints when welding structural steels, the alloying systems providing those mechanical properties, but containing only limited amounts of the elements lowering the temperature of the start and the end of the martensite transformation in the welded joints, have been used. Formation of hard, martensitic heat-affected zones caused by higher cooling rates is undesirable, because martensitic structure bears a higher risk of cracking during cooling. Such alloying elements can be C, Mn, Cr and Ni. For example, a submerged arc welding process (SAW) with no shielding gas described in "Effects of Cobalt On The Structure and Properties of High Strength Weld Metal", Avt. Svarka 1984, No. 7, pp.45-48. Welding high strength base metal is accomplished by using submerged arc welding which utilizes a fluxed core welding wire or a solid wire and a flux material not contained in the wire, but provided externally. The flux material provides shielding of the weld metal from the atmosphere by melting and forming a slag over the pool of molten weld metal during welding. The described SAW process is limited to flat and horizontal welding positions.

Therefore, reducing cold and hot cracking in weld joints of steels welded by a welding process providing high deposition rates would be highly desirable. Since there is a tendency in many industries to use high strength steel in order to reduce the amount of steel needed to complete a project, reducing cold and hot cracking in higher strength steels, such as 100 ksi and higher, is especially desirable. Therefore, the demand for the high strength low alloy filler metal is expected to rise.

SUMMARY OF THE INVENTION

The present invention is a consumable welding wire used in a FCAW of steels. The composition of the steel sheath of the wire electrode comprises, in addition to Fe, about 0.02% of C, about 0.5% of Mn. The weld metal morphology in the FCAW process is controlled by the addition of Co to the fluxed core of the wire. More specifically, the present invention is directed to a welding wire having C, Mn, Ni, Co, Zr, Ti and B together as alloying elements added to the fluxed core.

A weld wire of the present invention comprises a steel sheath encapsulating a fluxed core having a combination of fluxing compounds and alloying elements. The fluxing compounds comprise up to 2% Wt of fluoride compounds and up to 49% Wt of oxide compounds. The alloying elements comprise Mn, Ni, Co, Ti and up to about 0.98% Wt of C. The amount of Co is sufficient to produce a ferrite-bainite weld metal morphology of a resulting weld.

A FCAW apparatus which uses the novel wire has a welding gun with means for feeding the wire electrode into the welding gun. The wire has a sheath encapsulating a fluxed core composition having up to 2% Wt of fluoride compounds, up to 49% Wt of oxide compounds, Mn, Ni, Co, Ti and up to about 0.98% Wt of C. It is important to note that the amount of Co should be sufficient to produce a ferrite-bainite weld metal morphology of a resulting weld. The welding apparatus couples to a power source to supply the electrical current to the electrode and to a gas source to supplying a shielding gas to the welding apparatus.

A FCAW process using the novel fluxed-core wire-electrode uses a welding apparatus with means for feeding the electrode into the welding apparatus and means for supplying a shielding gas into the welding apparatus. The arc is formed between the electrode and a base metal by coupling the welding apparatus to a power source, and the electrode into the welding apparatus, the shielding gas is supplied into the welding apparatus to shield the electrode and the arc from the surrounding environment. The electrode of the described composition has a sufficient amount of Co to produce a ferrite-bainite weld metal morphology of a weld.

BRIEF DESCRIPTION OF THE DRAWING FIGURES

FIG. 3a is a table (Table 1) providing percentages of components and alloying elements in the fluxed core.

FIG. 3b is a table (Table 2) of weld metal compositions.

FIG. 3c is a table (Table 3) which shows actual weights of the fluxing components in the fluxed core.

Figure 1:
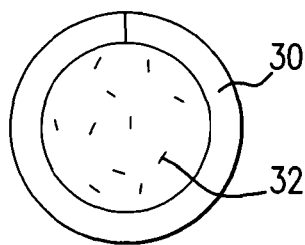
FIG. 1 is a cross-sectional view of the fluxed-core wire of the present invention.

FIGS. 4(a)-(d) are the resulting microstructures of various weld metal samples.

FIG. 5 provides data of a physical test of an exemplary fluxed-core wire.

DETAILED DESCRIPTION OF THE INVENTION

The fluxed core wire of the present invention comprises a metal sheath and a fluxed core composition with the preferred fill of about 16% by weight. Other fill percentages are possible if preferred by particular applications of different metal bases. The fluxed is characterized by a composition which results in a fine-grained morphology of the acicular ferrite+bainite in the produced weld metal. The detailed chemical and elemental composition of the fluxed core of the wire of the present invention is provided in Table 1 shown in FIG. 3a.

The primary function of Si in the present fluxed core composition is to deoxidize the weld pool during welding. If oxygen is present in the welding process and remains in the resulting weld metal, it will cause porosity in the weld metal, which would be an undesirable result. Si also plays a role in substitution strengthening and increased hardeanability of the produced weld. The present invention limits the concentration of Si in the weld metal composition to about 0.3% to minimize the amount of inclusion growth and its adverse effect on the weld microstructure. The primary role of Mn is to influence substitution strengthening and increased hardeanability of the weld microstructure. It also removes S from the weld pool (S forms undesirable low melting point inclusions on the grain boundaries of the weld metal). The primary role of C, the main alloying agent of the present invention, is to perform interstitial strengthening. The primary role of Ni is to increase toughness of the resulting weld metal. As the amount of Ni in an alloy increases, the lower shelf impact energy is raised while the upper shelf impact energy is lowered.

The main function of Ti and Zr in the present fluxed core composition is to control the size and distribution of oxide inclusions, since both elements are strong oxide and nitride formers. Formation of smaller oxide inclusions in the weld microstructure is important for the heterogeneous nucleation of acicular ferrite, which requires less energy. Lower energy produces acicular ferrite grains with smaller grain size in the weld metal. Oxide inclusions also minimize the grain growth at elevated temperatures by providing a drag force to the grain boundaries, slowing their growth and reducing the grain size in the solid state. The resulting small grain size of the acicular ferrite increases the surface area of the formed grain boundaries, which causes the impurities present in the weld metal to be less concentrated and, therefore, less detrimental to impact toughness of the weld. The smaller grain size and the larger number of grains in the weld metal also increases toughness, because the large number of smaller grains impedes the concentration and growth of the cracks as well as formation and travel of dislocations inside the weld.

Use of alloying element Co in the fluxed core of the inventive wire is particularly important for controlling the morphology of the weld metal produced by the FCAW process. The present invention contemplates the amounts of Co in the core to be up to 4.98% Wt. In particular, the fluxed core combination of the wire comprises a combination of Ni and Co. The resulting compositions of the welds (% by weight) produced in the experimental welding runs are presented in Table 2 shown in FIG. 3b The best formulation turned out to be number 17-020 which resulted in weld joints of good yield and acceptable impact strength (in the [ksi] units). The actual weights of the fluxing compounds and elements are provided in Table 3 of FIG. 3c. The total weight of the fluxing mix is about 5 lbs for all the formulas (from 17-019 to 17-024).

The process of manufacturing a fluxed core wire of the present invention involves a series of steps in which a strip (or a sheath material) is fed through the shaping dies which bend the strip and form it into a shape that can later be filled with the ingredients of the fluxed-core composition. Usually, the shape is a U-shape. The shaped sheath is then filled with the fluxed-core composition which has a combination of fluxing compounds and alloying elements. The fluxing compounds comprise up to 2% Wt of fluoride compounds and up to 49% Wt of oxide compounds. The alloying elements comprise Mn, Ni, Co, Ti and up to about 0.98% Wt of C. The wire then travels through the closing dies which close it into a tubular form in which the sheath 30 completely encapsulates the core 32, forming a fluxed-core wire as illustrated in FIG. 1. The ingredient of the fluxed-core composition are often powdered, which is compacted when the encapsulated wire is fed through the drawing dies to reduce the wire's diameter to the final desired size.

Various fluxing components listed in Table 1 (shown in FIG. 3a) are added to produce the welds characterized by the minimum yield strength of 100 ksi for both high and low heat input welding, as well as the minimum Charpy impact of 30 ft-lbs at −40° C. The fluxed core wire of the present invention makes it possible to produce the welds at welding interpass temperatures as low as 200 F (93 C) while minimizing the risk of hot or cold cracking. (Interpass temperature is the temperature maintained during welding, until completion of the weld joint. Minimum and maximum interpass temperatures are typically the same as the minimum and maximum preheat temperatures). In particular, the fluxing compounds react with hydrogen before it enters into the molten weld pool, reducing the concentration of hydrogen pockets in the weld metal and, therefore, the possibility of cold cracking. The resulting weld metal has a low concentration of diffusable hydrogen, typically less than 4 ml/100 g.

Figure 2:
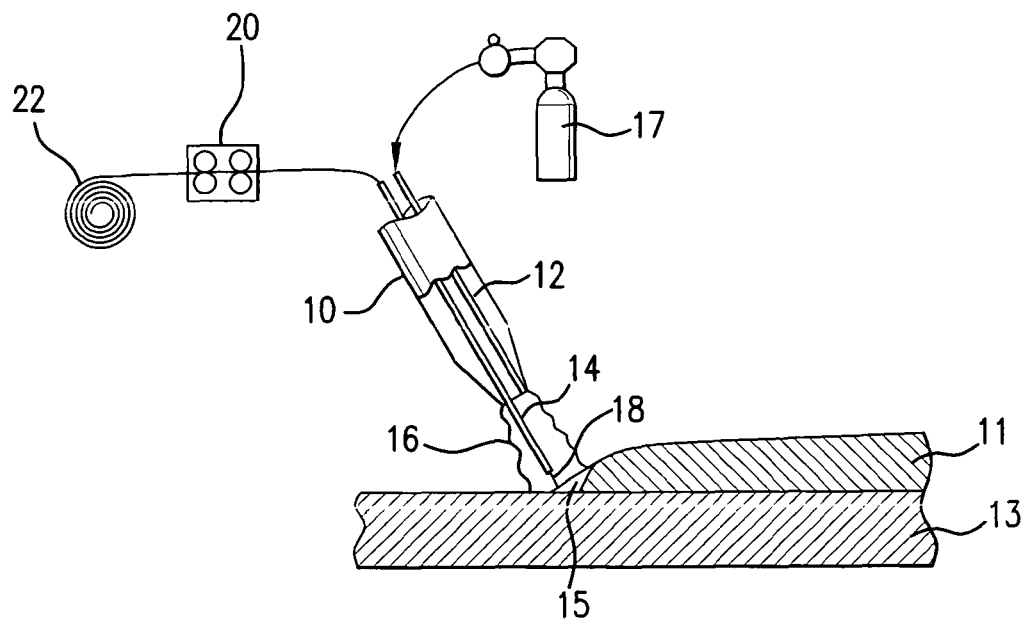
FIG. 2 is a schematic illustration of the FCAW process with the fluxed-core welding wire of the present invention.
Figure 4A:
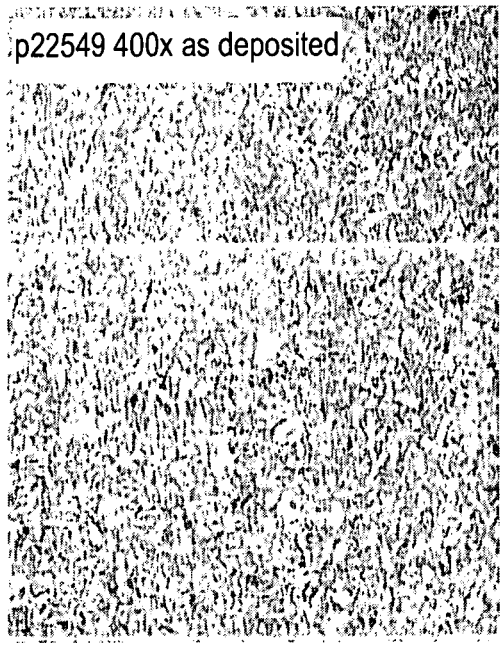
Figure 4B:
Figure 4C:
Figure 4D:

A welding apparatus for FCAW utilizing the wire of present invention is shown as an illustrative example in FIG. 2. The welding apparatus comprises a direct current power supply 50, a welding gun 10 with an electrode 14 and means for feeding the electrode into the welding gun. An example of the means for feeding the electrode shown in FIG. 2 is a wire drive 20 and a wire reel 22. It should be understood, of course, that any other way of feeding the wire electrode into the welding gun falls within the scope and spirit of the present invention. A shielding gas 16 is supplied to the welding process through gas nozzle 12 in the welding gun. Electrode 14 has a sheath and a core having a fluxed core composition comprising fluxing compounds and alloying elements in percentages as shown in Tables 1 and 2, shown, respectively, in FIGS. 3a and 3b. For the FCAW process in which the welding gun is coupled to a direct current power supply, the preferred shielding gas is a mixture of Ar and $CO_2$ mixed in the 75% Ar/25% $CO_2$ or 90% Ar/10% $CO_2$ or 95% Ar/5% $CO_2$ proportions. It is also possible to use 100% of $CO_2$ as a shielding gas, as well as 95% Ar/up to 5% of $O_2$ to stabilize the arc. The arc 18 is formed between the wire electrode Lt. of the present invention and the work pieces (sheets 11 and 13 in FIG. 2) to form a molten weld pool 15. The shielding gas 16 can be supplied to the welding process from an external source 17, as shown in FIG. 2.

To form a weld on a work piece using the welding apparatus with a novel flux-cored wire electrode of the present invention, a welding process uses a welding apparatus with means for feeding the wire electrode and means for supplying a shielding gas into the apparatus. The means for feeding the wire into the welding apparatus can comprise a wire drive and a wire reel, or any other suitable arrangement supplying the wire into the apparatus with the speed sufficient to replace the portion of the wire consumed during the welding process. It is contemplated that the means for feeding the wire into the welding apparatus can be internal or be located outside of the apparatus. The welding apparatus is coupled to a direct current power supply and the arc is formed between the electrode and the work piece on which the weld is to be formed. Supplying the shielding gas into the welding process can be done from an external gas supply feeding the gas into a gas nozzle of the welding apparatus.

Feeding the wire electrode of the present invention into the welding apparatus involves providing the wire with a sheath and a fluxed core having a core composition as provided in Table 1 (FIG. 3a) and Table 32 (FIG. 3b). The preferred mixture of shielding gas is a mixture of Ar and $CO_2$ mixed in the 75% Ar/25% $CO_2$ or 90% Ar/10% $CO_2$ or 95% Ar/5% $CO_2$ proportions. It is also possible to use 100% of $CO_2$ as a shielding gas, as well as 95% Ar/up to 5% of $O_2$ to stabilize the arc.

The above-described welding process is preferably used in the direct current FCAW process. The work piece used in the FCAW process comprised two base steel plates. The steel plates used for the experimental runs were of the type HY-100 and HY-80, 2.5 cm thick. The composition of the steel plates in weight percentages is provided in Table 4.

TABLE 4

Base metal compositions.

| Element (% Wt) | HY-100 | HY-80 |
| --- | --- | --- |
| C | Up to 0.193 | Up to 0.149 |
| Mn | Up to 0.322 | Up to 0.312 |
| P | Up to 0.001 | Up to 0.005 |
| S | Up to 0.002 | Up to 0.006 |
| Si | Up to 0.207 | Up to 0.202 |
| Cu | Up to 0.109 | Up to 0.188 |
| Cr | Up to 1.236 | Up to 1.103 |
| V | Up to 0.005 | Up to 0.004 |
| Ni | Up to 2.249 | Up to 2.149 |
| Mo | Up to 0.251 | Up to 0.248 |
| Al | Up to 0.016 | Up to 0.015 |
| Ti | Up to 0.001 | Up to 0.001 |
| Zr | Up to 0.001 | Up to 0.001 |
| Nb | Up to 0.001 | Up to 0.001 |
| Co | Up to 0.008 | Up to 0.007 |
| B | Up to 0.0001 | Up to 0.0001 |
| W | Up to 0.001 | Up to 0.001 |
| Sn | Up to 0.005 | Up to 0.006 |
| Pb | Up to 0.0024 | Up to 0.0022 |

Turning now to FIG. 4, the representative morphology of a weld (a cross-section of a tensile specimen coded P22549 at different resolutions) is shown there in the photos of microstructures 4(a) 4(d) of a specimen that was weld using electrode formula 17-005 (Table 2, shown in FIG. 3b). Such morphology is typical for the fluxed core wires listed in Table 2 shown in FIG. 3b. A tensile plate was welded using a 1 inch (2.5 cm) thick HY-100 grade steel. 22 welding passes were used to join the plate. The welding parameters used to complete the weld are as follows from Table 4:

TABLE 4

Welding Parameters used to weld P22549

| | |
|---|---|
| Voltage | 28 |
| Amperage | 250 |
| Wire Feed Speed | 480 |
| Root opening of plate | ½ inch |
| Included angle of plate | 45 degrees |
| Preheat before welding | 200 F. |
| Interpass temperature | 225 F. |
| Backup bar thickness | ½ inch |

The flux composition of the fluxed-core wire of formula 17-005 is as follows from Table 5:

TABLE 5

Flux composition by weight % of formula 17-005

| | |
|---|---|
| C | 0.60 |
| Si | 2.60 |
| Mg | 2.00 |
| Ti | 0.79 |
| Mn | 11.78 |
| B | 0.09 |
| CO | 9.99 |
| Ni | 5.99 |
| Fe | 12.91 |
| Flourides | 0.61 |
| Oxides | 52.65 |
| Total | 100.00 |

In the microstructures shown in FIGS. 4(a)-4(d) the white areas correspond to the ferrite and upper bainite phases, the dark etching areas show lower bainite with inclusions of carbides dispersed through the matrix as black spots. No significant presence of martensite seemed to be present in the microstructure. The results of physical tests of the same specimen are shown in FIG. 5.

What is claimed is:

1. A weld wire for use in a flux-cored arc welding (FCAW) process of welding high strength steel, comprising:
   a fluxed core including, by weight:
   alloying elements comprising (i) about: 11-13% of Ni and 11-16% of Fe, and (ii) up to about: 1% of C, 4.98% of Co, 0.1% of B, and 0.25% of Zr; and
   fluxing compounds comprising: (i) about 0.5-2% of metal fluorides and (ii) about 20-49% of oxides; and
   a steel sheath encapsulating the fluxed core, wherein an amount of Co in the fluxed core of the weld wire is used in the FCAW process of welding the high strength steel for controlling a fine-grained morphology of acicular ferrite-bainite in a produced weld metal.

2. The weld wire of claim 1, wherein the alloying elements further comprise about 12-20% of Mn and up to about: 1% of Ti, 2% of Mg, and 3.0% of Si.

3. The weld wire of claim 1, wherein the steel sheath comprises, by weight, up to about: 0.02% of C and 0.5% of Mo.

4. The weld wire of claim 1, wherein the alloying elements comprise 11.18% of Ni.

5. The weld wire of claim 1, wherein the alloying elements comprise 11.1-11.9% of Fe.

6. The weld wire of claim 1, wherein the alloying elements comprise 0.98% of C.

7. The weld wire of claim 1, wherein the alloying elements comprise 4.98% of Co.

8. The weld wire of claim 1, wherein the alloying elements comprise 0.06% of B.

9. The weld wire of claim 1, wherein the alloying elements comprise 0.00% of B.

10. The weld wire of claim 1, wherein the alloying elements comprise 0.23% of Zr.

11. The weld wire of claim 1, wherein the fluxing compounds comprise about 1.9-2.0% of metal fluorides.

12. The weld wire of claim 11, wherein the fluxing compounds comprise 1.96-1.98% of metal fluorides.

13. The weld wire of claim 1, wherein the fluxing compounds comprise about 45-49% of oxides.

14. The weld wire of claim 13, wherein the fluxing compounds comprise 47.4-47.9% of oxides.

* * * * *